No. 637,202. Patented Nov. 14, 1899.
J. C. DES GRANGES.
MOTION REVERSING AND SPEED CHANGING MECHANISM.
(Application filed Feb. 27, 1899.)
(No Model.)
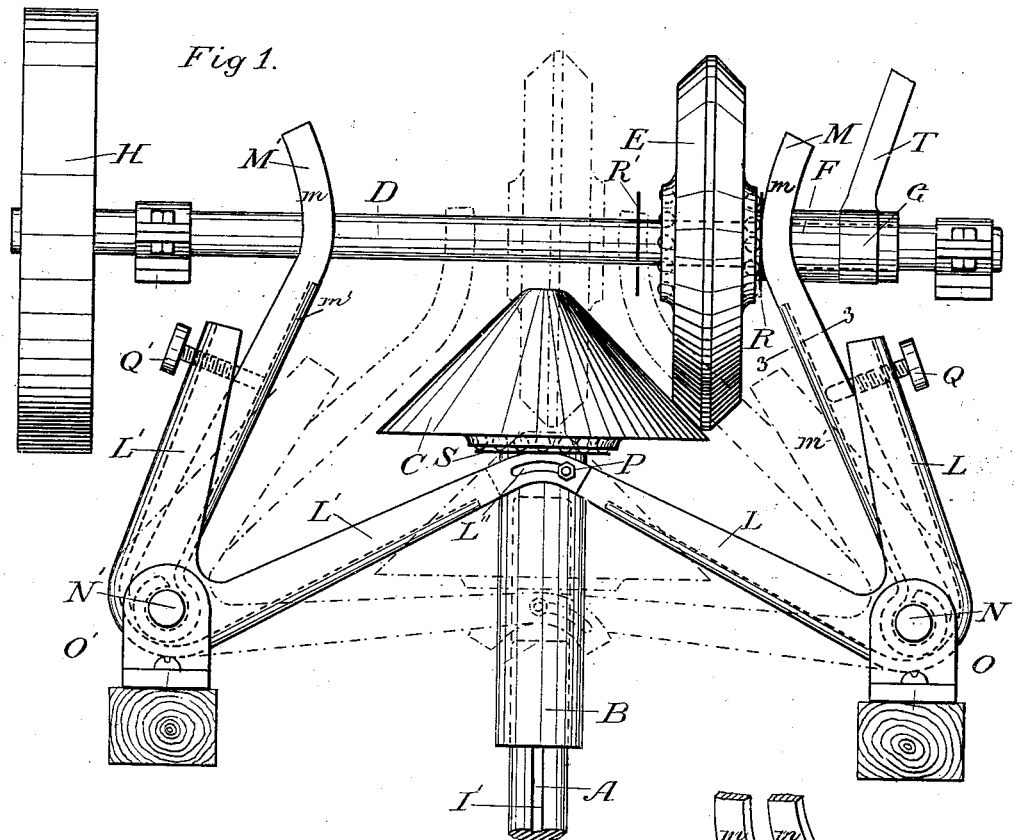
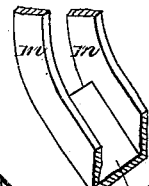
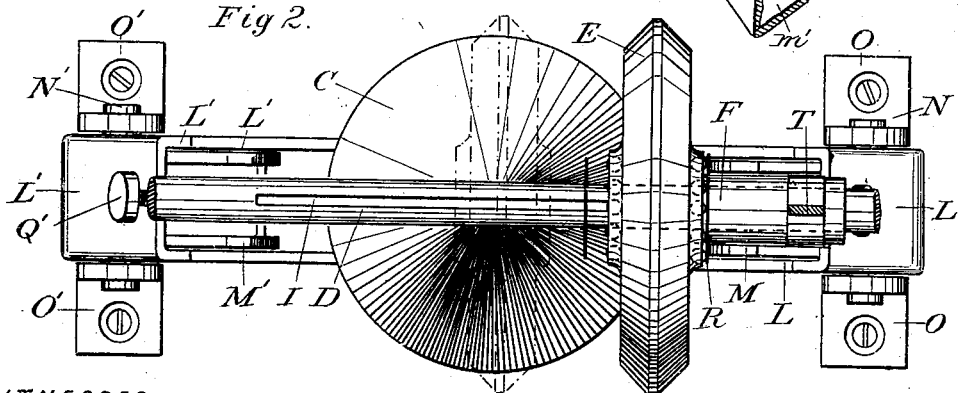
WITNESSES.
Elmer Harpham
M. McGinnis
INVENTOR
John C. des Granges
by Hazard & Harpham
his Attorneys.

UNITED STATES PATENT OFFICE.

JOHN C. DES GRANGES, OF LOS ANGELES, CALIFORNIA, ASSIGNOR TO HESTER DES GRANGES, OF SAME PLACE.

MOTION-REVERSING AND SPEED-CHANGING MECHANISM.

SPECIFICATION forming part of Letters Patent No. 637,202, dated November 14, 1899.

Application filed February 27, 1899. Serial No. 707,077. (No model.)

*To all whom it may concern:*

Be it known that I, JOHN C. DES GRANGES, a citizen of the United States, residing at Los Angeles, in the county of Los Angeles and State of California, have invented new and useful Motion-Reversing and Speed-Changing Mechanism, of which the following is a specification.

My invention relates to devices employed to transfer motion from one rotating shaft to another to vary the speed of the driven shaft and to reverse the motion thereof in any kind of machinery, and it is especially adapted to motor-vehicles; and the object of my invention is to accomplish by simple means the purpose for which said machinery is designed. I accomplish this object by means of the mechanism illustrated in the accompanying drawings, in which—

Figure 1 is an elevation of my device. Fig. 2 is a plan of the same; and Fig. 3 is a cross-section of the arm M, taken on the line 3 3 of Fig. 1.

A is the driving, and D the driven, shaft. It is immaterial, however, which is the driven and which the driving shaft, as the device will work equally well with the power applied to either shaft.

H is a pulley mounted on the driven shaft D.

C is a friction-cone to which is attached the sleeve B. Into this sleeve the driving-shaft A projects, the sleeve B having a longitudinal movement thereon, but being prevented from rotating thereon by a longitudinal lip (not shown) which projects from the inner perimeter thereof into the slot I' in the shaft A.

E is a double friction-cone mounted on the driven shaft D and having an endwise or longitudinal movement on said shaft, but is prevented from rotating thereon by means similar to that employed to prevent the cone C from rotating on shaft A. The cone E may consist of two separate cones base to base, or approximately so, on the shaft, or it may consist of one single piece forming a double cone, as shown, the bases of the conical parts more or less distant one from the other. These cones are arranged in rolling contact, whereby the motion of the cone C is transferred to the cone E, and the motion of cone E on the shaft D is regulated by the lever T. On the lower end of this lever is the collar G, working in an annular groove in the sleeve F, which is affixed to the cone E. The axes of the shafts A and D are preferably placed in one and the same plane and at right angles to each other. These cones are held in rolling contact with each other, and at the same time an endwise movement of both on their respective shafts is permitted. However, these cones may be rigidly keyed on their respective shafts, in which case the shafts will have a longitudinal movement. This longitudinal movement may be imparted to the shafts or cones by any suitable means, such as springs, weights, or levers.

M is an arm, U-shaped in cross-section, pivotally mounted on the fulcrum N and bifurcated at its free end, the bifurcations m passing on either side of the sleeve F and bearing against an annular washer R, surrounding the shaft D and loosely interposed between the cone E and the bifurcations of the arm M. Antifriction-balls are placed in bearings in the hub of the cone E, against which the washer R bears when pressed by the arm M. Like antifriction-balls are placed on the other side of the cone E and also on the under side of the cone C. The arms L and L' are slidably connected together by means of the bolts P, mounted on the bifurcations of the arm L and working in longitudinal slots L" in the bifurcations of the arm L'. The arms M are held in the desired position relative to the arms L by the thumb-screw Q, and by means of this screw the desired pressure of the cones together is controlled. The fulcrum N being placed in a proper position relative to the shafts A and D, (the subtended angle between the arms M and L remaining constant whatever position the cones may be in on the respective shafts,) and the free ends of the arms M and L, which bear against the washers R and S, are so curved that the arms M and L will simultaneously travel equal distances along their respective shafts and carry with them the cones E and C, maintaining thereby a constant contact and pressure between said cones.

The operation of my device is as follows: As longitudinal motion to the left is imparted to the cone E (which is shown in its extreme position to the right) through the lever T it will pass along and over the cone C, the cone C retreating from the shaft D the same distance that E advances. When the cone E is directly over cone C, the cones will be out of engagement with each other, the purpose of which is to permit an idle movement of E at this point. This disengagement is not essential in all cases, however. This position of the cones and arms is shown in dash-dot lines in Fig. 1. While in this position no motion will be imparted to the cone E from the cone C. As the cone E moves from its position as shown in full lines—in which position it has its maximum speed—to that shown in dash-dot lines the speed will continually decrease until motion ceases. The further movement of E along the shaft D will bring it in engagement with the arm M', when C will impart motion to E, but in a direction reverse to that which it had while on the other side of cone C. At this point the cone E will have its minimum speed. From this point, as it moves to the left, the speed will gradually increase until it has reached its maximum speed.

Having described my invention, what I claim as new, and desire to secure by Letters Patent, is—

1. A motion transmitting and reversing device comprising two cones, one on a driving and one on a driven shaft, both having a longitudinal movement with their respective shafts but non-rotative thereon; one of said cones being a double cone comprising two cones having a common base, and the other being a single cone, the conical surfaces of the double cone adapted to receive on either side of its common base the rolling contact of the conical surface of the single cone, and means to move the cones and to keep their conical surfaces in contact, whereby when motion is imparted to the driving-shaft a variable motion may be imparted to the driven shaft and the motion of the same may be reversed.

2. A device to vary the speed and change the motion of machinery comprising two friction-cones, one a double and one a single cone, arranged in rolling contact, one on a driving and one on a driven shaft; said cones having a longitudinal movement on their respective shaft.

3. In combination, the driving-shaft A and driven shaft D, the friction-cone C slidably mounted on the shaft A, but non-rotative thereon, the double friction-cone E slidably mounted on the shaft D, but non-rotative thereon, the arms M and L pivotally mounted on the fulcrum N for moving said cones and the lever T, substantially as shown and described.

4. A device to vary the speed and reverse the motion of machinery, comprising two friction-cones (one being a double cone) rotary shafts carrying the same, each cone having a longitudinal movement on its respective shaft, but non-rotative thereon, and means, substantially as shown, to keep said cones in rolling contact while the cones are being moved on their respective shafts.

5. A speed-varying and motion-reversing device, comprising the double cone E, having an endwise movement along or with the shaft D on which it is mounted, and means to effect said movement, but non-rotative on said shaft; shaft D arranged substantially at right angles to the driving-shaft A, and substantially in the same plane therewith; the driving-shaft A; the cone C non-rotatively mounted on shaft A; regulating-arms M and L and means to adjust the pressure between the cones, substantially as shown, whereby the speed may be varied and the movement reversed at will.

6. The herein-described device, comprising a driving and a driven shaft; two frictional cones, one a single and one a double cone, arranged in rolling contact one with the other, the double cone having a longitudinal movement of its shaft across the conical face of the single cone to bring a conical surface of the double cone into engagement with the conical surface of the single cone on either side of the common base of the double cone, one cone on one shaft and the other cone on the other shaft, each cone being movable along the axis of its revolution but non-rotative on its shaft, and means to move said cones longitudinally and to keep them in rolling contact, whereby the speed of the driven shaft may be varied or the motion of the same reversed.

7. A motion transmitting and reversing device comprising two cones, one on a driving and one on a driven shaft, both having a longitudinal movement on their respective shafts but non-rotative thereon; one of said cones being a double cone comprising two cones base to base and the other being a single cone, the conical surfaces of the double cone adapted to receive on either side of its common base the rolling contact of the conical surface of the single cone, and means to move the cones and to keep their conical surfaces in contact, whereby when motion is imparted to the driving-shaft a variable motion may be imparted to the driven shaft and the motion of the same may be reversed.

8. A device to vary the speed and change the motion of machinery comprising two friction-cones, one a single and one a double cone arranged in rolling contact, one on a driving and one on a driven shaft, said cones having a longitudinal movement of their respective shafts; the conical surface of the single cone arranged to contact with the conical surface of the double cone on either side of its common base.

In witness that I claim the foregoing I have hereunto subscribed my name, this 20th day of February, 1899, at Los Angeles, California.

JOHN C. DES GRANGES.

Witnesses:
 G. E. HARPHAM,
 HENRY T. HAZARD.